May 24, 1938. W. M. SULLIVAN ET AL 2,118,061

HANDLED BEER CAN

Filed Sept. 26, 1936

INVENTOR.
William M. Sullivan
John H. Shannon
BY Lyon & Lyon
ATTORNEYS

Patented May 24, 1938

2,118,061

UNITED STATES PATENT OFFICE 2,118,061

HANDLED BEER CAN

William M. Sullivan and John H. Shannon, Los Angeles, Calif.

Application September 26, 1936, Serial No. 102,737

6 Claims. (Cl. 220—43)

This invention relates to a handled can. It is customary to sell beverages, for example, beer in cans, and it is the present practice to open the cans, and then pour the beer or other beverage into a drinking glass, or mug. Beer, and similar beverages are frequently consumed on picnics, or the like, where it is not convenient to carry glasses or cups for drinking such a beverage. The general object of this invention is to provide such a container, or can, with a handle normally held in a folded or collapsed condition, and capable of being swung up to an extended position when desired, so that the can after being opened, can be used as a drinking cup to drink the beverage directly from its container.

A further object of the invention is to construct the handle in such a way that when it is moved to its extended position, it will operate to remove the cover of the can.

A further object of the invention is to provide a handle of simple construction, and which is normally carried in a folded condition at the side of the can, but which can readily be extended to form a handle with a member extending down the side of the can and at a distance from the can body, as an ordinary handle; also to provide such a handle with simple means for limiting the upward swinging movement of the handle to its extended position.

A further object of the invention is to produce a handle which will be inexpensive to manufacture, and which can be readily attached to the side of a can, the handle being constructed of light sheet metal in such a way that the material out of which the handle is constructed, will flex at certain points so as to attain the effect of pivot or hinge connections at these points; also to construct such a handle so that it can be readily attached to the side of a can and normally maintained in a folded condition, but which can readily be raised to an upright position in which it will operate as an efficient handle for the can.

Further objects of the invention will appear hereinafter.

The invention consists in the novel parts and combination of parts to be described hereinafter, all of which contribute to produce an efficient handled beer can.

A preferred embodiment of the invention is described in the following specification, while the broad scope of the invention is pointed out in the appended claims.

Referring more particularly to the parts, 1 indicates a can body having a cover or lid 2 with a crimped flange 3 at its margin, enabling the cover to be secured to the can body over a gasket 4. This gasket would be used whenever the can must be liquid-tight, or air-tight.

Figure 1:
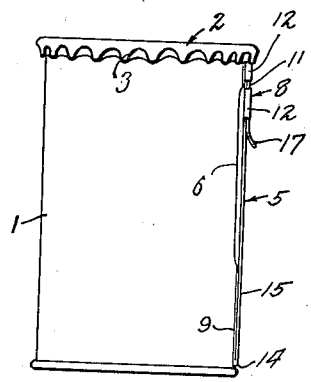
Fig. 1 is a side elevation of a can provided with our invention, and showing the handle in the folded condition that it would have when the can is ready to be opened.
Figure 3:
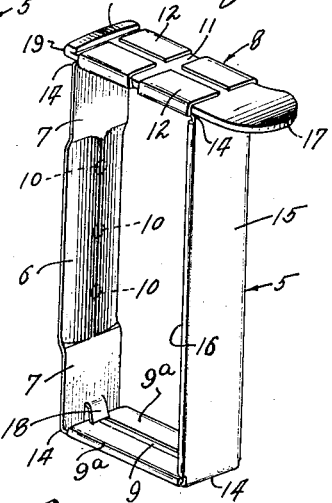
Fig. 3 is a perspective of the handle attachment, which is constructed of a separate piece to be attached to the can body.

In Fig. 3, 5 indicates the handle assembly which, in Fig. 1, is illustrated folded against the side of the can body 1. This assembly 5 is preferably formed of a strap or band of thin metal, which has sufficient resiliency to enable the same to be bent without breaking. The band is formed as illustrated in Fig. 3, so as to produce an inner vertical bar, the body 6 of which is curved transversely so as to present a concave inner face to fit the radius of the outer face of the can to which the handle is to be attached. This inner bar also includes substantially flat tongues 7 at its ends, said tongues being integral of course, with the upper horizontal member 8 and the lower horizontal member 9 of the handle which, as illustrated in Fig. 3, is of substantially rectangular form in its raised position. The body 6 of the inner bar of the handle is attached to the side of the can in any suitable manner, preferably by a plurality of spot welds, as indicated by the dotted lines 10 in Fig. 3.

It should be understood that the member 8 is a part of the continuous piece of strap metal which forms the body of the handle. The upper end of the handle also includes a lever 11, which is made out of relatively stout flat metal attached to the upper side of the member 8 by flanges 12 integral with the member 8, which are bent up over this part 11. The inner end of the part 11 is preferably bent over upon itself in an upward direction to form an enlarged head 13 (see Fig. 5). By reason of the fact that the metal strap out of which the handle is formed is readily bendable, the handle assembly will readily bend at the four corners 14, and in order to facilitate this operation the outer vertical bar 15 of the handle is reinforced throughout nearly its entire length by bending its edges inwardly to form flanges 16. These flanges stiffen the vertical handle bar 15. In a similar manner the horizontal lower bar 9 of the handle structure is reinforced throughout its length by bending the material up to form flanges 9a. In this way the members 9 and 15 are stiffened except at the points where they connect to each other, and with the other members that form the complete handle. In other words, by reason of the flexibility of the metal at the corners 14, it will be understood that the movable parts of the handle are hingedly connected to each other, attaining the effect of pivotal connections, or hinge pins, without employing such hinge connections, which would be relatively expensive to employ.

Figure 2:
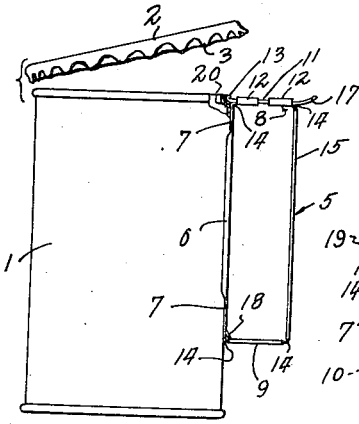
Fig. 2 is a side elevation and partial section showing the handle in its raised position, and indicating the manner in which it operates to raise the edge of the can lid.

The outer end of the lever 11 is turned upwardly so as to form a projecting finger-hold or tongue 17, which projects outwardly from the side of the can as illustrated in Fig. 1, and gives opportunity to a person opening the can, to pry this tongue 17 upwardly. In this connection, referring to Fig. 4, it will be noted that in the folded condition of the handle against the side of the can, the head 13 lies directly within the crimped flange 3 of the can lid, so that when the lever 11 is swung upwardly toward an elevated position the can lid will be pried off, as indicated in Fig. 2.

Figure 4:
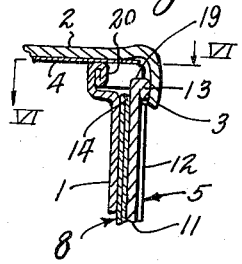
Fig. 4 is a fragmentary view, and is a vertical section taken at the upper end of the handle when the handle is in the folded condition indicated in Fig. 1. This view shows adjacent portions of the can body and lid in section.
Figure 5:
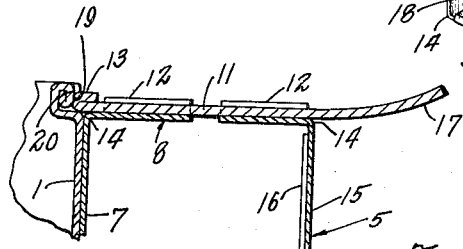
Fig. 5 is a view similar to Fig. 4, but showing the handle in an extended position, and indicating the means for limiting the upward swinging movement of the handle.
Figure 6:
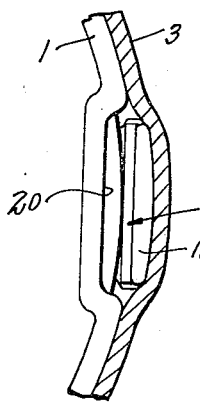
Fig. 6 is a horizontal section on an enlarged scale taken about on the line 6—6 of Fig. 4, passing under the lid, indicating how the lid is crimped over the upper end of the handle.

Means is provided to limit the upward swinging movement of the handle. This may be accomplished by providing a stop in the form of a small tongue 18, which is integral with the lower tongue 7 of the inner vertical bar of the handle (see Fig. 3). This stop is struck outwardly from the material of the inner bar at this point, and prevents the horizontal lower bar 9 of the handle from being raised beyond a horizontal position. If desired, additional stop means for this purpose may be provided by constructing the parts so that the end face 19 of the lever 11 in its elevated position, will abut against the wall of the can in the manner illustrated in Fig. 5. If it is necessary in employing this form of stop, the lip 20 of the can body may be slightly offset inwardly as indicated in Figs. 4 and 5. However, it should be understood that in these figures, the thickness of the metal is greatly magnified for the sake of clearness, and in practice, the offset at this point would be very slight because the metal employed would be very thin.

It will be evident that the handle assembly 5 can be constructed at very low cost, and secured to the side of a can body as described, before the lid 2 is put in place. When the handle is raised to its extended position as described and as indicated in Figs. 2 and 3, the lid 2 will be disengaged or sufficiently loosened to enable it to be readily disengaged, and thereafter the handle will operate as an effective handle for the can, which becomes transformed into a cup.

Although the handle is formed of very thin metal, by reason of the use of the flanges 16 on the vertical bar 15 of the handle, this bar can be grasped readily in the hand without discomfort.

It will be evident that our improvement can be attached to a can at very slight expense, and the use of the invention, in a simple manner enables an ordinary can to be transformed into a drinking cup. One of the benefits arising from the use of the invention is that if the beverage is a charged beverage, such as beer, the beer keeps its "head" more effectively if left in the original can. In other words, where beer is poured out of a can into a glass, a considerable amount of the gas in the beer escapes, tending to make the beer taste flat.

In practice, if desired, the handle may be made of stiff paper to reduce the cost of manufacture.

It will be evident that in the folded condition of the handle, beer cans having this improvement can be packed closely for shipment like ordinary cans. It will be noted that the handle bar 15 forms a link connecting the upper member 8 with the lower member 9.

What we claim is:

1. A can having a body, and a cover with a crimped flange securing the cover to the body, a handle having a member hingedly connected to the body under the said flange and extending down the side of the body, said handle including a lever hingedly connected to the side of the body substantially in line with and below the hinge point of said member, and a link connecting the said lever and said member, said handle capable of being swung upwardly on the hinge connections into an extended position, thereby enabling the said member to disengage the cover from the body.

2. A can having a body with a removable cover, a handle having a member hingedly connected to the body adjacent the same, normally in a folded position extending down the side of the body, said handle including a lever hingedly connected to the side of the body substantially in line with and below the hinge point of said member, and a link connecting the said lever and said member, said handle capable of being swung upwardly on the hinge connections into an extended position, said handle having means operating to limit the upward movement of the handle.

3. A can having a body with a lip at its upper end, and a cover seating on the lip of the can, a handle having a member hingedly connected to the body adjacent said cover and extending down the side of the body, said handle including a lever pivotally attached to the side of the body substantially in line with and below the pivot point of said member, and a link connecting the said lever and said member, said handle capable of being swung upwardly on the pivotal connections into an extended position, thereby enabling the said member to disengage the cover from the body, said member having a head adjacent its pivotal connection to the can body, and said head having a face operating to engage the lip of the can body to limit the upward swinging movement of the handle.

4. A can having a body, and a cover with a crimped flange securing the cover to the body, a handle having a member hingedly attached to the body adjacent the said flange and extending down the side of the body, said handle capable of swinging upwardly toward the cover into an extended position, and having a substantially horizontal member secured to the can body and extending outwardly therefrom in the extended position of the handle, said handle also having a substantially vertical member connecting the outer end of said last-named member with the outer portion of the first-named member, and means for limiting the upward swinging movement of the handle in its extended position.

5. A handle attachment for a can body, said handle attachment consisting of a band of flexible metal including a bar to be attached to the side of the can in a substantially upright position, and including a pair of substantially horizontal members, and a vertical member connecting the horizontal member, said vertical member operating as a handle for the can, said handle attachment being capable of swinging up in substantially vertical plane so as to assume substantially rectangular form, and means for stiffening the horizontal members and the outer vertical handle member to prevent the metal bending except at the corners of the rectangle formed by the extended handle.

6. A handle attachment constructed as described in claim 5, having a reinforcing lever extending along the upper end of the rectangle formed by the extended handle to stiffen the upper substantially horizontal member.

WILLIAM M. SULLIVAN.
JOHN H. SHANNON.